(12) United States Patent
Karlsen

(10) Patent No.: US 7,466,627 B2
(45) Date of Patent: Dec. 16, 2008

(54) SYSTEM AND METHOD FOR WIRELESS DATA COLLECTION FROM SEISMIC RECORDING BUOYS

(75) Inventor: Kenneth Karlsen, Oslo (NO)

(73) Assignee: PGS Geophysical AS, Lysaker (NO)

( * ) Notice: Subject to any disclaimer, the term of this patent is extended or adjusted under 35 U.S.C. 154(b) by 154 days.

(21) Appl. No.: 11/254,653

(22) Filed: Oct. 20, 2005

(65) Prior Publication Data

US 2007/0091722 A1 Apr. 26, 2007

(51) Int. Cl.
*G01V 1/38* (2006.01)
(52) U.S. Cl. ............................. 367/77; 367/15; 367/19
(58) Field of Classification Search ................... 367/15, 367/19, 21, 77; 342/367
See application file for complete search history.

(56) References Cited

U.S. PATENT DOCUMENTS

| 3,181,146 | A | * | 4/1965 | Huckabay et al. | 342/135 |
| 3,325,778 | A | * | 6/1967 | Ballard | 367/21 |
| 3,604,004 | A | * | 9/1971 | Buyer | 342/386 |
| 4,309,763 | A | * | 1/1982 | Passmore et al. | 367/3 |
| 4,663,744 | A | | 5/1987 | Russell et al. | |
| 4,958,328 | A | * | 9/1990 | Stubblefield | 367/15 |
| 5,303,240 | A | * | 4/1994 | Borras et al. | 370/347 |
| 5,625,885 | A | * | 4/1997 | Nakazawa et al. | 340/7.22 |
| 5,818,385 | A | * | 10/1998 | Bartholomew | 342/372 |
| 5,835,059 | A | * | 11/1998 | Nadel et al. | 342/398 |
| 5,910,789 | A | * | 6/1999 | Vigen | 342/357.03 |
| 5,995,040 | A | * | 11/1999 | Issler et al. | 342/352 |
| 6,512,481 | B1 | * | 1/2003 | Velazquez et al. | 342/367 |
| 2004/0217908 | A1 | | 11/2004 | Zigler et al. | |

FOREIGN PATENT DOCUMENTS

EP 92109160.9 5/1992

\* cited by examiner

*Primary Examiner*—Jack W Keith
*Assistant Examiner*—Scott A Hughes
(74) *Attorney, Agent, or Firm*—E. Eugene Thigpen; Richard A. Fagin

(57) ABSTRACT

A seismic data acquisition telemetry system includes a seismic vessel including a data recording system thereon. The system includes a seismic data gathering unit in operative connection with at least one seismic sensor. The system includes a first antenna disposed on the seismic vessel and a second antenna disposed on the data gathering unit, at least one of said first and second antennas being directional. Means are included for orienting a sensitive direction of the directionally sensitive antenna toward the other of said first and second antennas.

10 Claims, 3 Drawing Sheets

SYSTEM AND METHOD FOR WIRELESS DATA COLLECTION FROM SEISMIC RECORDING BUOYS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of marine seismic surveying. More specifically, the invention relates to methods and systems for transferring seismic data from a fixed-position data recorder or telemetry unit to a seismic vessel or other moving data collection device.

2. Background Art

Marine seismic data acquisition systems known in the art include recording buoys which are anchored to the sea bed. A typical recording buoy includes data storage equipment known in the art for storing seismic data. Such data storage equipment may include storage devices such as tape drives, magnetic hard drives, solid state random access memory and the like. The seismic data are acquired from various seismic sensors. In seismic data acquisition systems that use recording buoys, the seismic sensors are typically disposed in one or more cables positioned on the water bottom, such a cable being known as an "ocean bottom cable". The sensors in the cable generate electrical and/or optical signals corresponding to the particular parameter being measured, the parameter being pressure, time gradient of pressure and/or a particle motion related parameter such as velocity or acceleration. Electrical and/or optical conductors in the cable transfer the signals generated by the seismic sensors to the data storage equipment in the recording buoy.

The data storage equipment on the recording buoy may be interrogated by a seismic data processing and recording system disposed on a seismic vessel or elsewhere. The interrogation may be performed by connecting a data transfer cable between the seismic data processing and recording system on the seismic vessel and the storage equipment in the recording buoy, or, preferably, the interrogation may be performed by wireless telemetry.

In a typical seismic survey using ocean bottom cables and recording buoys, a plurality of ocean bottom cables are deployed along the water bottom in a selected pattern, and the seismic vessel moves along the water surface in a predetermined pattern near the positions of the ocean bottom cables. The seismic vessel, or another vessel, tows one or more seismic energy sources. The seismic energy sources are actuated at selected times, and the signals generated by the sensors in the ocean bottom cables in response to detecting seismic energy are transferred to the storage equipment in the recording buoy. In survey techniques known in the art, the data stored in the recording buoys are accessed by interrogating the data storage equipment after completing the acquisition, or between parts of the acquisition. In any event, to establish wireless telemetry, the seismic vessel is moved to a location where wireless communication can be established between the recording buoy and the seismic vessel, and the vessel remains substantially at that location during the storage device interrogation.

It is desirable to be able to transfer seismic data from the recording buoy to the seismic vessel while the seismic vessel is moving during a survey using ocean bottom cables. The ability to transfer data while the seismic vessel is moving would enable, among other things, more rapid quality evaluation of the seismic data. Quality control of the data during acquisition could provide, for example, that the seismic vessel is able to return immediately to any portion of the predetermined pattern to reacquire the seismic data in the event any of the data in such portion are substandard. Such ability may provide cost savings by reducing the operating time for the seismic vessel.

Wireless telemetry devices known in the art for transferring data between two substantially fixed position devices are disclosed, for example, in U.S. Pat. No. 4,663,744 issued to Russell et al. The Russell et al. '744 patent discloses a real time seismic telemetry system including a central command station for communication with a plurality of remote data acquisition units, such as recording buoys. The central command station has a command unit for controlling the operation of a transmitter, for providing instructions to the data acquisition units. The data acquisition units receive the instructions on a receiver and process the instructions in a logic control circuit. Seismic data are detected by one or more sensors and converted to digital data for transmission through a transmitter which is tuned to a discrete channel for each data acquisition unit. The command station has a PCM receiver tuned to each of the channels for demodulating the data stream therefrom. A digital receiver is provided in the command unit for synchronizing and processing the data. The digital receiver synchronizes both to the bit rate and to the beginning and ending of the digital word such that data contained in the digital word can be multiplexed onto a data bus. The data bus is controlled by an external storage/control for storage of the data from all of the digital receivers for all of the discrete channels.

Direct adaptation of such wireless seismic telemetry systems known in the art to transfer of seismic data (or between two moving vessels) has proven difficult because seismic telemetry systems known in the art for transmitting data between fixed locations typically use directionally sensitive antennas. Directionally sensitive antennas have a large magnetic dipole moment along essentially one direction and provide relatively high signal gain along that direction, but provide substantially no signal sensitivity along any other direction. Thus, it is impracticable to use fixed position, directionally sensitive antennas to communicate signals between two devices that move relative to each other. Omni directional antennas provide substantially uniform signal gain in any direction from the antenna, but the gain is relatively small, and for high data-rate telemetry, such as would be used in multi-channel seismic data acquisition, low signal gain would require relatively high telemetry transmitter power. Because typical recording buoys are powered by batteries, it is desirable to keep the power consumption of the telemetry system as small as practical. Therefore, the power output of the telemetry transmitter in a typical recording buoy would be limited. Accordingly, there is a need for a seismic data telemetry system that enables signal communication between a recording buoy and a moving seismic vessel that does not require a high power transmitter.

SUMMARY OF INVENTION

One aspect of the invention is a seismic data acquisition system. A seismic data telemetry system according to this aspect of the invention includes a seismic vessel. The system includes a seismic data gathering unit in operative connection with at least one seismic sensor. The system includes a first antenna disposed on the seismic vessel and a second antenna disposed on the data gathering unit, At least one of the antennas is directionally sensitive. Means are included for orienting a sensitive direction of the directionally sensitive antenna toward the other antenna.

Another aspect of the invention is a method for maintaining telemetry between a seismic data gathering unit and a seismic vessel. A method according to this aspect of the invention includes sensing a direction between the seismic vessel and the data gathering unit, and orienting a directionally sensitive antenna substantially along the direction.

Another aspect of the invention is a method for conducting a marine seismic data acquisition survey. A method according to this aspect of the invention includes deploying at least one ocean bottom cable on a bottom of a body of water. The ocean bottom cable has a plurality of seismic sensors thereon at spaced apart locations. A seismic energy source is towed from a seismic vessel near the surface of the body of water, and the source is actuated at selected times. Seismic signals are detected at the sensors, and the detected signals are communicated to a data gathering unit. A direction between the seismic vessel and the data gathering unit is determined. A directionally sensitive antenna is oriented substantially along the direction, and the communicated signals are telemetered from the gathering unit to the seismic vessel through the antenna.

Other aspects and advantages of the invention will be apparent from the following description and the appended claims.

DETAILED DESCRIPTION

Figure 1:
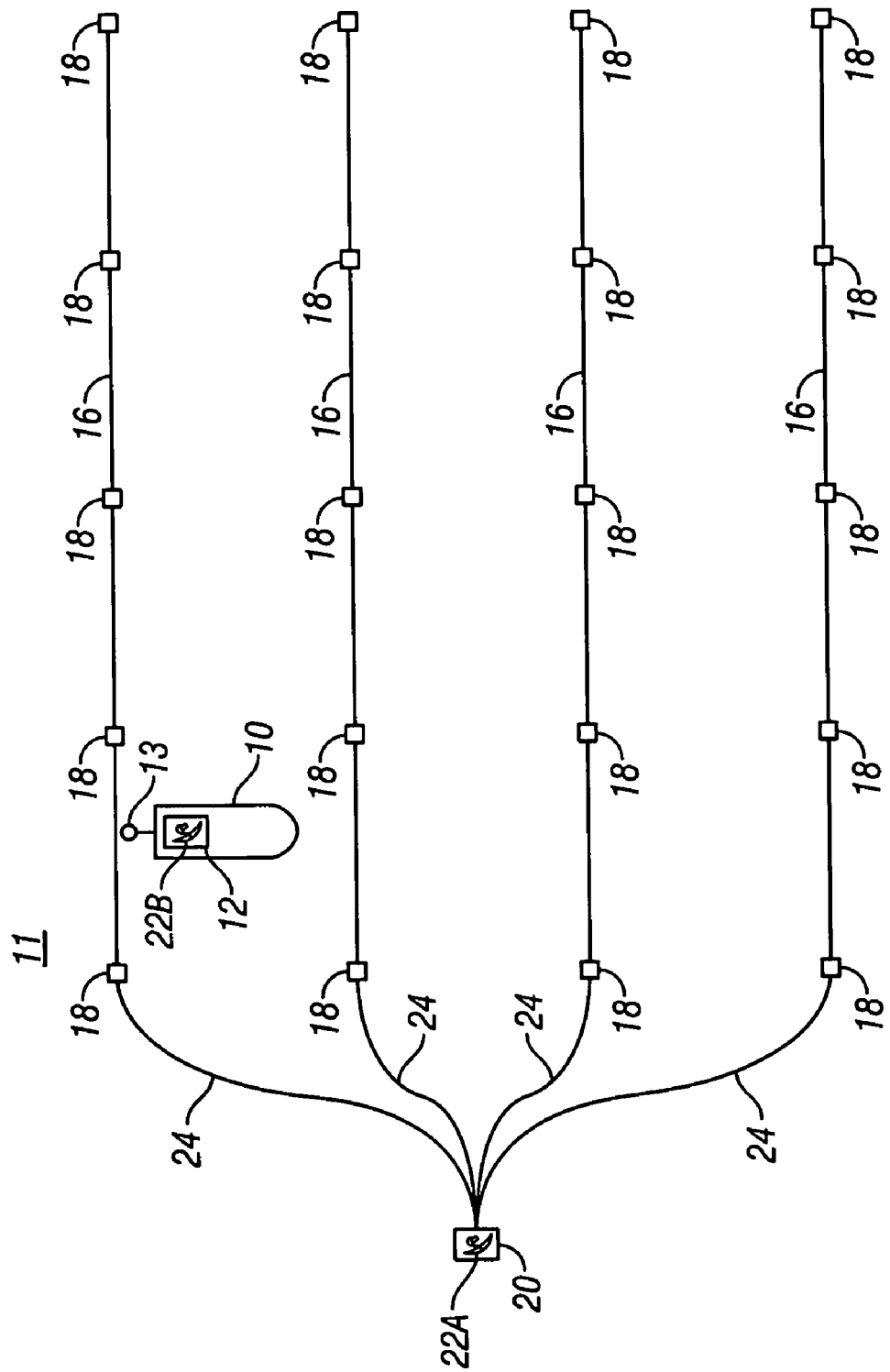
FIG. 1 shows a seismic acquisition system including one embodiment of a directional antenna telemetry link according to the invention.

A seismic data acquisition system that can be used with various embodiments of a telemetry system according to the invention is shown schematically in plan view in FIG. 1. A seismic vessel 10 typically includes thereon navigation, data acquisition and recording equipment and seismic source control equipment, shown collectively as a "recording system" 12. The seismic vessel 10 can tow one or more seismic energy sources 13, such as an air gun or an array of air guns. Alternatively another vessel may tow the one or more seismic energy sources. The seismic vessel 10 moves in a predetermined pattern on the surface of a body of water 11, such as a lake or the ocean. At selected times, the seismic source control equipment in the recording system 12 actuates the source 13. Seismic energy from the source 13 travels downwardly from the source 13 through the Earth formations below the bottom of the water 11, whereupon it may be reflected by subsurface acoustic impedance boundaries (not shown). Reflected seismic energy travels upwardly where it can be detected by seismic sensors 18 disposed on the water bottom.

In the present embodiment, the seismic sensors 18 can be disposed along cables 16 placed on the water bottom in a selected pattern. The sensors 18 are typically hydrophones and geophones, included in a typical configuration in a cable known in the art as an "ocean bottom cable" although the type of sensor and the type of cable are not limitations on the scope of the invention. The sensors 18, generate electrical and/or optical signals that correspond to the parameters being measured. The measured parameters are typically pressure or time gradient of pressure, and a particle motion-related parameter such as velocity or acceleration. The ocean bottom cables 16 may include electrical and/or optical conductors (not shown separately) therein for communicating the electrical and/or optical signals to a data gathering unit such as a recording buoy 20. The conductors may also carry electrical power to various signal amplification and processing circuits (not shown in the Figures) such as preamplifiers and digitizers, located along the cables 16.

The recording buoy 20 can include signal conditioning and recording equipment (not shown separately in FIG. 1) of types well known in the art for amplifying (and/or digitizing) and recording the signals from the various sensors 18. Typically, the cables 16 will be electrically coupled to the recording buoy 20 by lead in lines 24. Although the embodiment shown in FIG. 1 includes four cables 16, each having a respective lead in line 24, all of which are ultimately coupled to the recording buoy 20, it is to be understood that the number of such cables, lead in lines and recording buoys is not a limitation on the scope of the invention. Other configurations of an acquisition system may include more or fewer cables, lead in lines and recording buoys.

In the present embodiment, the recording buoy 20 and the recording system 12 may each include a directional antenna module, 22A and 22B, respectively. The directional antenna modules 22A, 22B each include a directionally sensitive antenna 30 (see FIGS. 2, 2A and 3) that provides substantial signal gain along one principal sensitive direction. The directional antenna modules 22A, 22B can transfer electromagnetic signals between them which represent, for example, system commands sent from the recording system 12 to the recording buoy 20 and/or seismic data sent from the recording buoy 20 to the recording system 12. Each directional antenna module 22A, 22B can include suitable telemetry transmitter and receiver circuitry, which will be explained in more detail below with reference to FIG. 2, to effect the required communication between the recording system 12 and the recording buoy 20.

In a first embodiment of the invention, as the seismic vessel 10 moves along the water 11 surface, orientation of the sensitive direction of the antenna 30 in each directional antenna module 22A, 22B is maintained toward the corresponding antenna in the other one of the modules 22A, 22B to maintain telemetry signal communication. Generally, an antenna module according to the invention automatically controls the orientation of the sensitive direction of each antenna toward the corresponding telemetry antenna. Various embodiments of apparatus to control the orientation of the sensitive direction will be further explained below with reference to FIGS. 2, 2A, 3 and 4. In other embodiments of a seismic data acquisition system, a directionally sensitive antenna module may be used on only one of the seismic vessel 10 and the recording buoy 20. In such embodiments, the corresponding signal telemetry antenna, located on the other one of the recording buoy or the seismic vessel, may be an omnidirectional antenna. Still other embodiments of a seismic data acquisition system may include a plurality of directional antenna modules on the seismic vessel, each adapted to maintain signal telemetry with a corresponding recording buoy.

Figure 2:
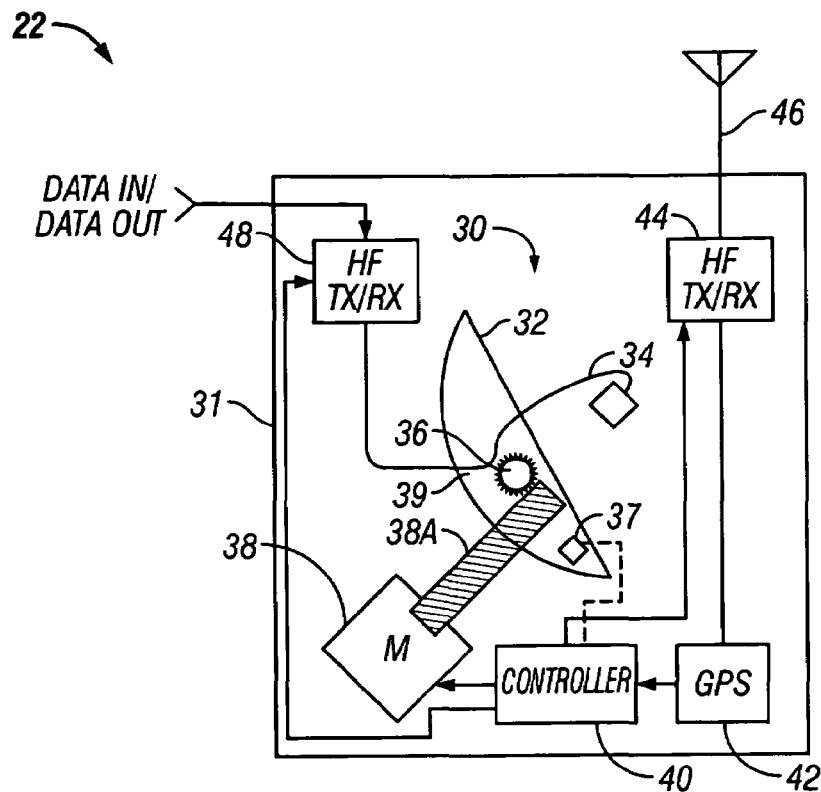
FIG. 2 shows one embodiment of a directional antenna telemetry module.

One embodiment of a directionally sensitive ("directional") antenna module and its antenna orientation control system, suitable for use as module 22A or 22B, is shown in FIG. 2 at 22. As explained above with reference to FIG. 1, such a module and included antenna orientation control system may be included on one or both of the seismic vessel and the recording buoy, and more than one such module may be included on the seismic vessel. Thus, the following description may apply to each of two or more substantially similar devices, affixed to one or both of the recording buoy and the seismic vessel. The directional antenna 30, in the embodiment of FIG. 2, can be a combined parabolic reflector 32 and an amplifier/waveguide 34, similar in configuration to well known satellite television receiver dish antennas. The sensitive direction (maximum dipole moment) of the directional antenna is generally perpendicularly outward from the center of the reflector 32. In the present embodiment, the reflector 32 and amplifier/waveguide 34 can be affixed to a rotatable mount 39 (explained in more detail below with reference to FIG. 2A), the mount 39 being affixed to a suitable platform 31 such that the sensitive direction of the directional antenna is generally horizontal, and the reflector 32 and amplifier/waveguide 34 can be rotated through a full 360 degrees of rotation. Rotation of the reflector 32 and amplifier/waveguide 34 may be performed by rotating a spur gear 36 coupled to the rotational mount 39. The spur gear 36 may be driven by a worm gear 38A, which can itself be directly driven by an electric motor 38. Other rotation apparatus are known in the art and include, for example, ring gears coupled to spur gears, planetary gears, and direct coupling of the rotational mounting to a motor. The present embodiment using the spur gear 36 and worm gear 38A intermediate the mount 39 and the motor 38 may provide the advantages of relatively precise control of the orientation of the directional antenna even using a low cost, ordinary electric motor, and can provide a high degree of resistance to having the orientation of the directional antenna moved by the action of wind, and motion of the water (11 in FIG. 1) which may cause the seismic vessel or recording buoy to heave.

Figure 2A:
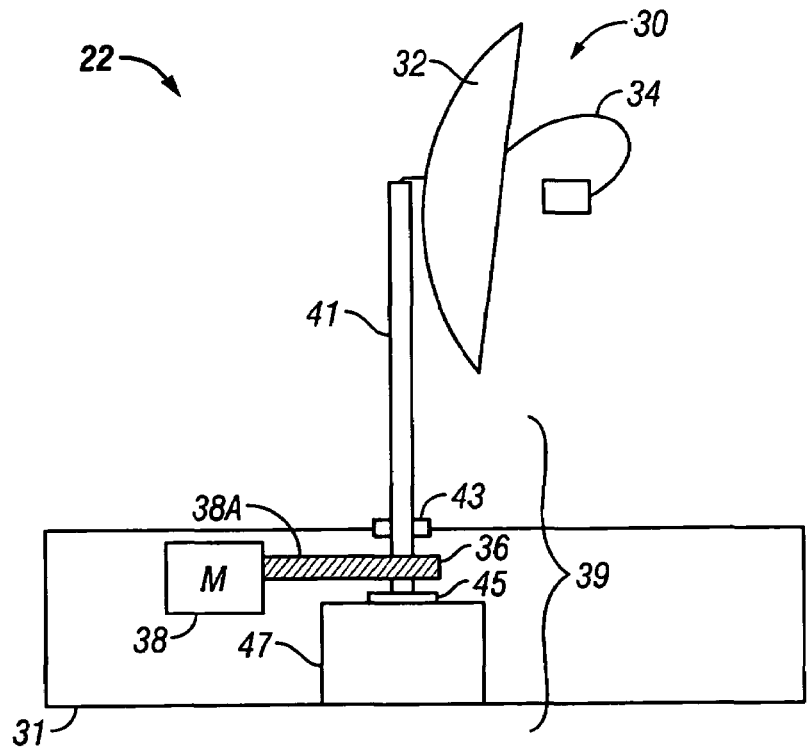
FIG. 2A shows a side view of the module shown in FIG. 2.

FIG. 2A shows the module 22 in side view to provide more detail as to the rotational mount 39 for the directional antenna 30. The reflector 32 and amplifier/waveguide 34 are shown mounted on a support shaft 41. Preferably, in addition to enabling antenna rotation, the support shaft 41 acts as a waveguide to maintain signal continuity to transceiver circuits (shown at 48 in FIG. 2). The support shaft 41 can be laterally supported in a radial bearing 43 mounted to a platform 31. Thrust load of the support shaft 41 can be applied to a thrust bearing 45 mounted on a suitable frame 47. The motor 38/worm gear 38A, and spur gear 36 are also shown in FIG. 2A.

Referring once again to FIG. 2, the amplifier/waveguide 34 may be electrically coupled to a high-frequency telemetry transceiver 48 of any type well known in the art. The telemetry transceiver 48, when used on the recording buoy (20 in FIG. 1) may receive signals from the seismic sensors (18 in FIG. 1) to be included in any known telemetry format for transmission to the recording system 12 on seismic vessel (10 in FIG. 1). The telemetry transceiver 48 may also receive command signals from the recording system (12 in FIG. 1) related to parameters such as actuation times of the seismic energy source (13 in FIG. 1), and which of the sensors (18 in FIG. 1) are to have signals detected and/or recorded, among other types of command signals. The telemetry transceiver 48 is referred to as "high frequency" to distinguish it from another telemetry transceiver, a "low-frequency" telemetry transceiver 44 which will be further explained below with reference to FIG. 3. Further, it is contemplated that the high-frequency telemetry transceiver 48 will be required to communicate to the recording system (12 in FIG. 1) substantially, in real time, the detected seismic signals from as many as several hundred or more individual seismic sensors (18 in FIG. 1), each being sampled at a 500 Hz or higher sample rate. Such communication requirements suggest that the required telemetry frequency may be 100 Mhz or more. It should be clearly understood, however, that the number of data channels being telemetered, the data sample rate and the seismic data telemetry frequency are not limitations on the scope of the invention.

Figure 3:
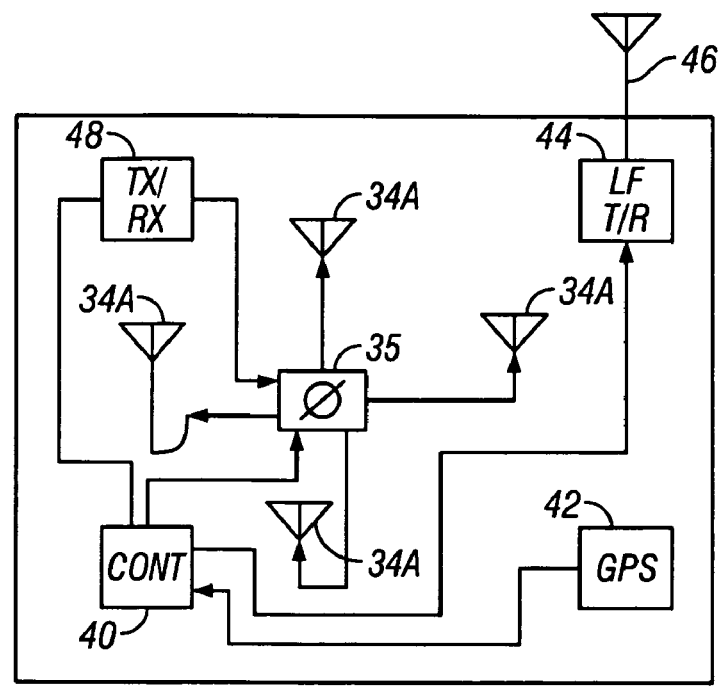
FIG. 3 shows another embodiment of a directional antenna telemetry module.

In the present embodiment, control of the orientation of the sensitive direction of the seismic data telemetry antenna of a selected one of the modules 22A or 22B (located on either the seismic vessel of the recording buoy) can be performed by determining the geodetic direction of the seismic data telemetry antenna of the corresponding module with respect to the selected module, and rotating the reflector 32 and amplifier/waveguide 34 of the selected module until a measured geodetic orientation of the sensitive direction of the reflector 32 matches the determined geodetic direction of the corresponding antenna. In the present embodiment, the geodetic direction of the corresponding antenna may be determined as follows. With reference to FIGS. 2 and 3, a geodetic position of the selected module (22A or 22B) may be determined by a global positioning satellite (GPS) receiver 42 disposed in or proximate to the selected module. Geodetic position information from the GPS receiver 42 may be communicated to a microprocessor-based controller 40.

An omnidirectional antenna 46 may receive similarly determined geodetic position information (contained in low frequency telemetry signals) transmitted from a low-frequency telemetry transmitter (not shown separately in FIG. 2) disposed near the corresponding seismic data telemetry (high frequency) antenna. Such low frequency telemetry may be detected by the low frequency transceiver 44, which is electrically coupled to the omnidirectional antenna 46, and communicated to the controller 40.

Correspondingly, the geodetic position of the selected module (22A or 22B) as measured by the GPS receiver 42 may also be communicated to the low frequency transceiver 44 for transmission to the corresponding low frequency antenna (not shown) disposed near the corresponding seismic data telemetry (high frequency) antenna.

In the present embodiment, the corresponding low frequency telemetry antenna (not shown) can be disposed nearby a corresponding GPS receiver and low frequency telemetry transceiver (not shown). The corresponding GPS receiver and low frequency telemetry transceiver send the geodetic position information for the corresponding antenna to the directional antenna module (22A or 22B), which information is detected as explained above using omnidirectional antenna 46 and low frequency transceiver 44. The received geodetic position information from the corresponding antenna, as explained above, is communicated to the controller 40. The controller 40 uses the geodetic position information for the directional antenna module and for the corresponding seismic data telemetry antenna to compute a geodetic direction from the selected directional antenna module to the corresponding seismic data telemetry antenna.

The geodetic orientation of the reflector 32 may be measured using a directional sensor 37, such as a two-channel flux-gate magnetometer or the like, affixed to the reflector 32 or the rotatable mount 39. The orientation measured by the directional sensor 37 is also communicated to the controller 40. The controller 40 operates the motor 38 until the measured orientation matches the computed geodetic direction to the corresponding antenna (not shown). Alternatively, the geodetic orientation of the reflector 32 may be determined by using devices such as a rotary position encoder coupled to the support shaft 41, such that a relative rotary orientation of the reflector 32 with respect to the module (22A or 22B) may be determined, such as by the controller 40. The geodetic orientation of the module (22A or 22B may be determined by a separate sensor, for example a two-channel magnetometer, or may be determined by using navigation data from the navigation devices in the recording system (12 in FIG. 1).

The geodetic position information telemetry is referred to herein as "low frequency" because it is contemplated that there will be only one data channel therein (the corresponding antenna position) and the data sample rate for the one data channel will be relatively low, such as a few Hz to 100 Hz. Accordingly, the operating frequency for the telemetry transceiver 44 may be on the order of a few KHz to 1 MHz. At such low frequencies, omnidirectional antennas are generally effective at maintaining signal communication, even at relatively low transmitter power output. It is to be understood that the telemetry frequency used for communicating geodetic position information is not a limitation on the scope of the invention. As a practical matter, the frequency for such telemetry is preferably selected such that omnidirectional antennas may be used.

During operation of the telemetry system, as the seismic vessel moves with respect to the recording buoy, the measurements of geodetic position of each of the vessel and the buoy are periodically redetermined. The geodetic direction between the vessel and the buoy is correspondingly redetermined, and the antenna orientation on both the vessel and the buoy is periodically adjusted to correspond to the redetermined geodetic direction.

An alternative embodiment to the one shown in FIG. 2 is shown in FIG. 3. The embodiment shown in FIG. 3 can include four, longitudinal dipole antennas 34A oriented substantially vertically, and arranged in a generally circular pattern. Each dipole antenna 34A can be coupled to the high frequency telemetry transceiver 48 through a phase shifter 35. The phase shifter 35 adjusts the relative signal phase at each antenna 34A to a selected departure from the signal phase of the input from the telemetry transceiver 48. The phase shifter 35 is shown as a single unit in FIG. 3, however, in other embodiments, the phase shifter may consist of an individual phase shifting element between the transceiver 48 and each individual dipole antenna 34A.

By suitable selection of phase shift between the signals at each dipole antenna 34A, the sensitive direction of the combined antennas 34A may be electronically controlled or rotated, correspondingly to mechanically rotating the directionally sensitive reflector/amplifier/waveguide combination shown in FIG. 2. The manner of determining the geodetic direction of the corresponding seismic telemetry antenna can be performed using a GPS receiver 42, low frequency telemetry transceiver 44 and omnidirectional antenna 46 substantially as explained with reference to FIG. 2.

In the present embodiment the effective sensitive direction of the combined antennas 34A is adjusted by the controller 40 calculating a value of phase shift for each antenna 34A and communicating the respective values of phase shift to the phase shifter 35, such that constructive interference and destructive interference between the signals radiated by each antenna 34A result in high signal gain (by constrictive interference) along a selected geodetic orientation. The selected geodetic direction is toward the corresponding data telemetry antenna, just as for the embodiment of FIG. 2 in which the antenna is mechanically rotated to such direction. In the present embodiment, by appropriate adjustment of the phase shift applied to each antenna 34A by the controller 40, the geodetic orientation of the direction of high signal gain can be selected to match the geodetic direction of the corresponding seismic signal telemetry antenna with respect to the platform 31. While FIG. 3 shows four dipole antennas, as will be appreciated by those skilled in the art, the number of such dipole antennas in other embodiments may be different.

Operation of the embodiment shown in FIG. 3 to maintain antenna orientation along the geodetic direction between the vessel and the buoy is substantially the same as explained above with reference to the embodiment shown in FIG. 2. To determine the geodetic orientation of the module shown in FIG. 3, a separate directional sensor (such as shown at 37 in FIG. 2) may be used, such as a two-channel magnetometer, or directional information may be obtained from the navigation equipment in the recording system (12 in FIG. 1).

Figure 4:
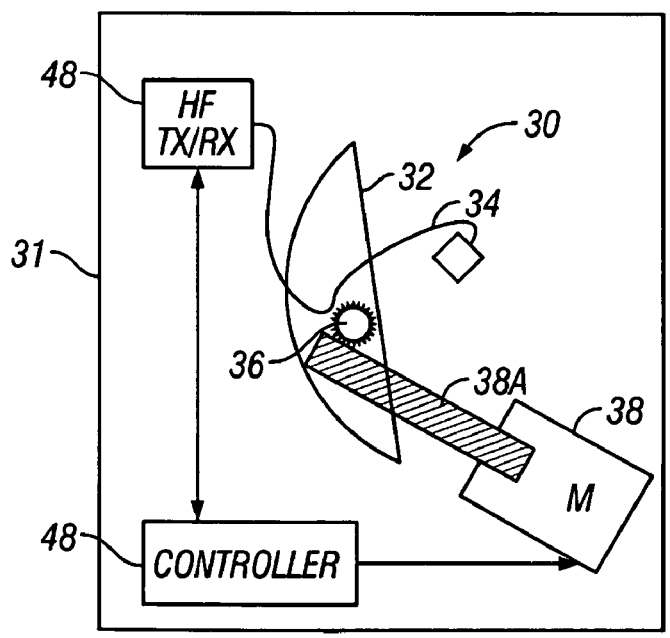
FIG. 4 shows another embodiment of a directional antenna telemetry module.

An alternative implementation of a directional antenna telemetry module that does not require determining of the geodetic positions of the modules on either the recording buoy or the seismic vessel is shown in FIG. 4. The embodiment shown in FIG. 4 may include a directional antenna substantially as explained with reference to FIG. 2, including a parabolic reflector 32, and amplifier/waveguide 34 electrically connected to the high frequency telemetry transceiver 48. A motor 38/worm gear 38A combination can drive a spur gear 36 coupled to a rotational mounting for the reflector 32, similar to that shown in FIG. 2.

In the embodiment of FIG. 4, an amplitude of the telemetry signal detected in the transceiver 48 (that signal being received from the corresponding seismic data telemetry antenna) is communicated to the controller 40. The controller 40 may be programmed to operate the motor 38 until the detected telemetry signal amplitude reaches a maximum value. Thereafter, the seismic data telemetry signal amplitude is communicated to the controller 40 periodically or continuously, and any changes in the detected telemetry signal amplitude will cause the controller 40 to operate the motor 38 to rotate the directional antenna so that a maximum telemetry signal amplitude is maintained. Advantageously, the embodiment shown in FIG. 4 does not require a GPS receiver and does not require use of the low frequency telemetry (described above) to receive position information from the corresponding antenna.

The embodiment shown in FIG. 4 may instead use dipole antennas and a phase shifter (collectively a "phased antenna array") to electronically rotate the sensitive direction of the phased antenna array, in a manner similar to the embodiment shown in FIG. 3 and explained with reference thereto. Maintaining the sensitive direction using a phased antenna array is performed similarly as explained above with respect to mechanical rotation of the antenna, that is, the incoming telemetry signal amplitude is measured, and the effective orientation of the phased antenna array is controlled to maintain maximum detected signal amplitude. It will be appreciated by those skilled in the art that the embodiment of FIG. 4 requires that the directional antenna (or phased antenna array) be used to detect incoming data telemetry or incoming command signals.

By using at least one controllable orientation, directional antenna module in a seismic data acquisition system, it can become more practical to transfer seismic data in real time from data storage equipment on a recording buoy to data recording equipment on a seismic vessel. By transferring the data in real time from the buoy to the seismic vessel during acquisition, it then becomes possible to quality check the seismic data during the acquisition procedure itself. Performing data quality control during a survey may reduce the chance of completing the survey only to find substandard data from one or more seismic sensors. Thus, corrective action may be taken with shorter delay or less lost time. The use of directional antennas may also reduce interference between signals from a plurality of different recording buoys.

As explained above, a directional antenna module such as explained above with reference to FIGS. 2, 2A, 3 and 4 may be used on both the recording buoy and the seismic vessel. A plurality of such antenna modules may also be used on the seismic vessel to maintain signal telemetry during a survey with a plurality of recording buoys. It will also be appreciated by those skilled in the art that corresponding directional antenna modules can be used on two or more seismic vessels, source vessels, or support vessels to maintain signal telemetry therebetween. Accordingly, the term "data gathering unit" as used herein may refer to a recording buoy or similar fixed position device, or may be another vessel or mobile device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic data telemetry system, comprising:
a seismic vessel;
a seismic data gathering unit in operative connection with at least one seismic sensor;
at least one of a seismic data telemetry transmitter and telemetry receiver disposed on the data gathering unit;
at least one of a seismic data telemetry receiver and telemetry transmitter disposed on the seismic vessel;
at least one directionally sensitive antenna disposed on one of the seismic vessel and the data gathering unit, the antenna operatively coupled to the at least one of the telemetry transmitter and receiver;
means for determining a geodetic position of the vessel associated with the vessel;
means for determining a geodetic position of the data gathering unit associated with the data gathering unit;
a geodetic position telemetry transceiver and omnidirectional antenna associated with each of the vessel and the data gathering unit;
means for determining a geodetic direction between the vessel and the data gathering unit in response to position data transmitted using the geodetic position telemetry transceiver; and
means for orienting and maintaining an orientation of a sensitive direction of the directionally sensitive antenna toward a corresponding antenna on the other one of the data gathering unit and the seismic vessel, the corresponding antenna operatively coupled to the at least one of the telemetry receiver and transmitter the means for orienting operative in response to the means for determining geodetic direction.

2. The system of claim 1 wherein the directionally sensitive antenna comprises a parabolic reflector rotatably mounted to the at least one of the gathering unit and the seismic vessel, and the means for rotating comprises a motor rotationally coupled to the reflector.

3. The system of claim 2 further comprising a directional sensor coupled to the reflector, and wherein the means for rotating comprises means for comparing a direction measured by the directional sensor to the geodetic direction.

4. The system of claim 3 wherein the directional sensor comprises a two channel magnetometer.

5. The system of claim 1 wherein the means for determining geodetic direction comprises a global positioning system receiver disposed on each of the gathering unit and the seismic vessel.

6. The system of claim 1 wherein the directionally sensitive antenna comprises a plurality of dipole antennas each coupled to a respective output of a phase shifter, and the means for rotating comprises means for determining a phase shift to be applied to each antenna such that a combined sensitivity thereof has a direction corresponding to the geodetic direction, the means for determining phase shift operatively coupled to the phase shifter.

7. The system of claim 1 wherein the means for orienting comprises a signal amplitude detector operatively coupled to the means for rotating, and the means for rotating comprises means for stopping rotation when a detected telemetry signal amplitude reaches a maximum value.

8. The system of claim 7 wherein the directionally sensitive antenna comprises a parabolic reflector rotatably mounted to the at least one of the gathering unit and the seismic vessel, and the means for rotating comprises a motor rotationally coupled to the reflector.

9. The system of claim 7 wherein the directionally sensitive antenna comprises a plurality of dipole antennas each coupled to a respective output of a phase shifter, and the means for rotating comprises means for determining a phase shift to be applied to each antenna such that a combined sensitivity thereof has a direction corresponding to a direction of maximum telemetry signal amplitude, the means for determining phase shift operatively coupled to the phase shifter.

10. The system of claim 1 wherein the seismic sensor is disposed in an ocean bottom cable.

* * * * *